United States Patent
Ogata

(10) Patent No.: US 11,951,434 B2
(45) Date of Patent: Apr. 9, 2024

(54) CERAMIC HONEYCOMB FILTER

(71) Applicant: PROTERIAL, LTD., Tokyo (JP)

(72) Inventor: Tomohisa Ogata, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 86 days.

(21) Appl. No.: 17/595,445

(22) PCT Filed: Jul. 30, 2020

(86) PCT No.: PCT/JP2020/029227
§ 371 (c)(1),
(2) Date: Nov. 17, 2021

(87) PCT Pub. No.: WO2021/024902
PCT Pub. Date: Feb. 11, 2021

(65) Prior Publication Data
US 2022/0193593 A1 Jun. 23, 2022

(30) Foreign Application Priority Data
Aug. 8, 2019 (JP) .................................. 2019-146535

(51) Int. Cl.
*B01D 46/24* (2006.01)
*B01J 35/04* (2006.01)

(52) U.S. Cl.
CPC ....... *B01D 46/247* (2013.01); *B01D 46/2418* (2013.01); *B01D 46/2429* (2013.01);
(Continued)

(58) Field of Classification Search
CPC ............ B01D 46/247; B01D 46/24491; B01D 46/2482; B01D 46/2494; B01D 46/2498;
(Continued)

(56) References Cited

U.S. PATENT DOCUMENTS 11,312,662 B2 * 4/2022 Brew ................... B01J 35/0026
2005/0191461 A1 9/2005 Kasai et al.
(Continued)

FOREIGN PATENT DOCUMENTS

JP  2005-125209 A  5/2005
JP  2005-270969 A  10/2005
(Continued)

OTHER PUBLICATIONS

International Search Report for PCT/JP2020/029227 dated Sep. 24, 2020 [PCT/ISA/210].

*Primary Examiner* — Robert A Hopkins
(74) *Attorney, Agent, or Firm* — Sughrue Mion, PLLC

(57) ABSTRACT

A ceramic honeycomb filter has (a) cross section areas of intake flow paths being larger than those of discharge flow paths; (b) the intake and discharge flow paths having octagonal cross section shapes with four-fold rotation symmetry each obtained by cutting off four corners from a square; (c) the intake and discharge flow paths being alternately arranged in a first direction and a second direction perpendicular to the first direction, such that their opposing sides are parallel; (d) the opening ratio of the intake flow paths being 45-60%; (e) the number of the flow paths per $cm^2$ being 30-60; (f) the thickness t1 of a cell wall between an intake flow path and a discharge flow path adjacent to that intake flow path being 0.150-0.260 mm; and (g) the thickness t2 of a cell wall between adjacent intake flow paths meeting $1.175 < t2/t1 < 1.6$.

3 Claims, 4 Drawing Sheets

(52) U.S. Cl.
CPC ... *B01D 46/24491* (2021.08); *B01D 46/2474* (2013.01); *B01D 46/2482* (2021.08); *B01D 46/2494* (2021.08); *B01D 46/2498* (2021.08); *B01J 35/04* (2013.01); *B01D 2279/30* (2013.01)

(58) Field of Classification Search
CPC ............ B01D 46/2429; B01D 46/2474; B01D 2279/30; B01J 35/04
USPC .......................................................... 55/523
See application file for complete search history.

(56) References Cited

U.S. PATENT DOCUMENTS

| | | |
|---|---|---|
| 2006/0188415 A1 | 8/2006 | Ohno et al. |
| 2006/0194018 A1 | 8/2006 | Ohno et al. |
| 2009/0297766 A1 | 12/2009 | Furuta |
| 2014/0123611 A1* | 5/2014 | Toyoshima .......... B01D 46/249 428/117 |

FOREIGN PATENT DOCUMENTS

| | | |
|---|---|---|
| JP | 2008-168279 A | 7/2008 |
| JP | 2011-167641 A | 9/2011 |
| WO | 2008/117559 A1 | 10/2008 |
| WO | 2012/133847 A1 | 10/2012 |

\* cited by examiner

CERAMIC HONEYCOMB FILTER

CROSS REFERENCE TO RELATED APPLICATIONS

This application is a National Stage of International Application No. PCT/JP2020/029227 filed Jul. 30, 2020, claiming priority based on Japanese Patent Application No. 2019-146535 filed Aug. 8, 2019.

FIELD OF THE INVENTION

The present invention relates to a ceramic honeycomb filter used for removing particulate matter, which may be called PM hereinafter, etc. from an exhaust gas discharged from internal combustion engines such as diesel engines, etc., thereby cleaning the exhaust gas.

BACKGROUND OF THE INVENTION

An exhaust gas discharged from internal combustion engines such as diesel engines, etc. contains a large amount of PM such as carbon-based soot, etc., which causes environmental pollution. Accordingly, a filter for removing (capturing) PM has conventionally been arranged in exhaust systems of diesel engines, etc. as a post-treatment apparatus. As such a filter, a ceramic honeycomb filter comprising a ceramic honeycomb structure is widely used. A ceramic honeycomb filter is usually constituted by a ceramic honeycomb structure comprising porous cell walls fainting pluralities of flow paths extending from an inlet-side end surface into which an exhaust gas flows to an outlet-side end surface from which the exhaust gas is discharged, and plugs sealing one end of each flow path at both ends of the ceramic honeycomb structure.

When such a ceramic honeycomb filter is used to remove PM from an exhaust gas, the exhaust gas flows into flow paths of the ceramic honeycomb filter sealed at the outlet-side end through the inlet-side end. The exhaust gas then passes through porous cell walls and enters flow paths sealed at the inlet-side end. While the exhaust gas passes through the porous cell walls, PM in the exhaust gas is captured by cell walls so that PM is accumulated on the cell walls. The exhaust gas from which PM is removed is discharged from the outlet-side end.

When the ceramic honeycomb filter is continuously used as a post-treatment apparatus for diesel engines, PM is accumulated on the cell walls as the time elapses, clogging the flow paths, and thus resulting in increased pressure loss of the filter. Accordingly, the accumulated PM is removed by burning for regeneration.

To prevent the flow paths from being clogged by PM accumulated on the cell walls, honeycomb filters in which exhaust-gas-entering-side flow paths have larger cross sections than those of exhaust-gas-exiting-side flow paths were recently proposed, for example, by Patent References 1-3.

Patent Reference 1 discloses a columnar honeycomb structure comprising large numbers of penetrating holes longitudinally arranged via cell walls; the penetrating holes being constituted by large-volume penetrating holes sealed at one end of the honeycomb structure to have a relatively large total area at a cross section perpendicular to the longitudinal direction, and small-volume penetrating holes sealed at the other end of the honeycomb structure to have a relatively small total area at the cross section; and the opening ratio $\alpha$ (%) of the honeycomb structure on the inlet side, and a cross section thickness difference t (mm) between cell walls partitioning adjacent large-volume penetrating holes and cell walls partitioning adjacent large-volume penetrating holes and small-volume penetrating holes meeting the relations expressed by the formula (1) of $0.0022\alpha+0.0329 \leq \beta \leq 0.0071\alpha+0.2553$, and the formula (2) of $36 \leq \alpha \leq 60$. Patent Reference 1 describes that each large-volume penetrating hole desirably has an octagonal shape in a cross section perpendicular to the longitudinal direction, and each small-volume penetrating hole desirably has a quadrilateral shape in the above cross section. Patent Reference 1 describes that in the honeycomb structure having such a constitution, the performance of cleaning an exhaust gas, etc. can be improved without increasing pressure loss, when a catalyst is carried more on the cell walls partitioning adjacent large-volume penetrating pores than on the cell walls partitioning large-volume penetrating pores and small-volume penetrating pores.

Like Patent Reference 1, Patent Reference 2 discloses a honeycomb filter having a structure in which the cross section area of each exhaust gas intake flow path (first cell) is larger than that of each exhaust gas discharge flow path (second cell), the cross section of the first cell has an octagonal shape or a quadrangular shape with circular corners, the cross section of the second cell has a quadrangular shape, and cell walls partitioning adjacent first cells are thicker than cell walls partitioning adjacent first and second cells. Patent Reference 2 describes that with such a structure, a fluid can flow easily from the intake flow paths to the discharge flow paths, resulting in lower pressure loss with soot and an increased flow rate of the fluid, namely, improved capturing performance with increased strength of the honeycomb filter.

Like Patent Reference 1, Patent Reference 3 discloses a honeycomb filter having a plugged honeycomb structure, in which the cross section area of each exhaust gas intake flow path (intake flow path) is larger than that of each exhaust gas discharge flow path (discharge flow path), at least one of the discharge flow paths is a reinforced flow path having a reinforcing portion in at least one corner at which cell walls are crossing in a cross section perpendicular to the flow path direction, the intake flow path is provided with a portion of reinforcing the intake flow path in at least one corner at which cell walls are crossing in a cross section perpendicular to the flow path direction, and the number of reinforced corners in the intake flow paths is smaller than that in the discharge flow paths. Patent Reference 3 describes that the intake flow paths preferably have an octagonal shape, and the discharge flow paths preferably have a quadrangular shape. Patent Reference 3 describes that with such a structure, the plugged honeycomb structure can have improved durability and excellent strength while suppressing increase in pressure loss.

However, the honeycomb filters described in References described above, in which the cross section area of each exhaust gas intake flow path is larger than that of each exhaust gas discharge flow path, are not sufficiently improved in pressure loss with soot, which is caused by the clogging of intake flow paths with PM accumulated on cell walls of the intake flow paths, needing further improvement. Also, further improved strength is desired on these honeycomb filters constituted by flow paths having octagonal cross sections and those having quadrangular cross sections.

PATENT REFERENCE

Patent Reference 1: JP 2005-125209 A
Patent Reference 2: WO 2008/117559 A
Patent Reference 3: WO 2012/133847 A

OBJECT OF THE INVENTION

Accordingly, an object of the present invention is to provide a honeycomb filter comprising exhaust gas intake flow paths having larger cross section areas than those of exhaust gas discharge flow paths, which has improved strength, while keeping initial pressure loss by avoiding increase in pressure loss with soot by preventing PM accumulated on cell walls of the intake flow paths from closing the intake flow paths.

SUMMARY OF THE INVENTION

As a result of intensive research in view of the above object, the inventors have found that by optimizing the cross section shapes of intake flow paths and discharge flow paths, and setting the desired thickness ranges of cell walls between adjacent intake flow paths and discharge flow paths and those between adjacent intake flow paths, a honeycomb filter can be provided with improved pressure loss and strength. The present invention has been completed based on such finding.

Thus, the ceramic honeycomb filter of the present invention comprises pluralities of flow paths partitioned by porous cell walls, a fluid entering one end of the filter and flowing through the porous cell walls being discharged from the other end of the filter;

pluralities of the flow paths comprising intake flow paths which are open on the one end side and sealed on the other end side, and discharge flow paths which are sealed on the one end side and open on the other end side; and in a cross section perpendicular to the longitudinal direction of the flow paths, (a) the cross section areas of the intake flow paths being larger than those of the discharge flow paths;

(b) the intake flow paths and the discharge flow paths having octagonal cross section shapes with four-fold rotation symmetry each obtained by cutting off four corners from a square;

(c) the intake flow paths and the discharge flow paths being alternately arranged in a first direction and a second direction perpendicular to the first direction, such that their opposing sides are parallel via the cell walls;

(d) the opening ratio of the intake flow paths being 45-60%;

(e) the number of the flow paths per $cm^2$ being 30-60;

(f) the thickness t1 of a cell wall between an intake flow path and a discharge flow path adjacent to that intake flow path being 0.150-0.260 mm; and (g) the thickness t2 of a cell wall between adjacent intake flow paths meeting 1.175<t2/t1<1.6.

In a cross section perpendicular to the longitudinal direction of the flow paths in the ceramic honeycomb filter of the present invention, the length α1 of a side of the intake flow path opposing an adjacent intake flow path, the length α2 of a side of the intake flow path opposing an adjacent discharge flow path, the length β1 of a side of the discharge flow path opposing an adjacent discharge flow path, and the length β2 of a side of the discharge flow path opposing an adjacent intake flow path preferably meet 0.2<α1/α2<1.2, 0.3<β1/β2<1.2, and 0.3<β1/α1<1.5.

In the ceramic honeycomb filter of the present invention, the porous cell walls preferably have porosity of 45-60% and a median pore diameter of 5-20 μm.

Effect of the Invention

The present invention can provide a honeycomb filter having improved strength, with initial pressure loss kept by avoiding pressure loss increase with soot, which is caused by closing cell walls with PM accumulated thereon.

DESCRIPTION OF THE PREFERRED EMBODIMENTS

The embodiments of the present invention will be explained blow referring to the figures. The present invention is not restricted to the embodiments below but may be modified or improved within the scope of the invention.

[1] Ceramic Honeycomb Filter

Figure 1:
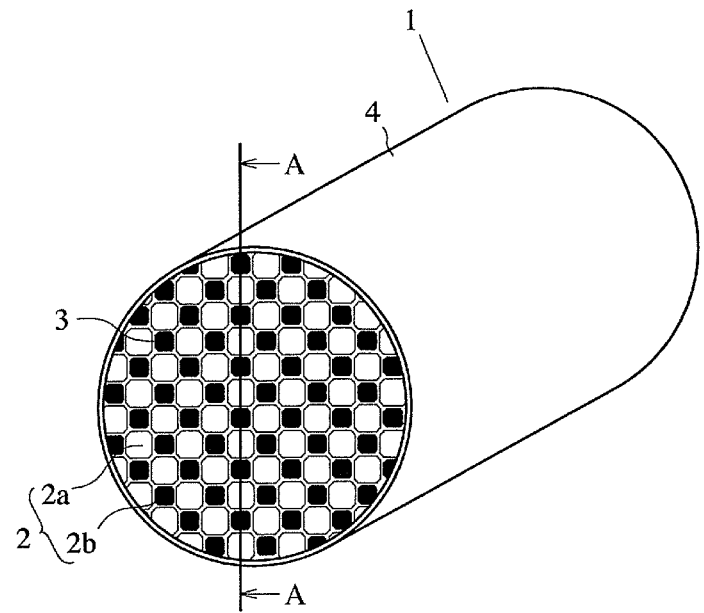
FIG. 1 is a perspective view schematically showing an example of the ceramic honeycomb filters of the present invention.
Figure 2:
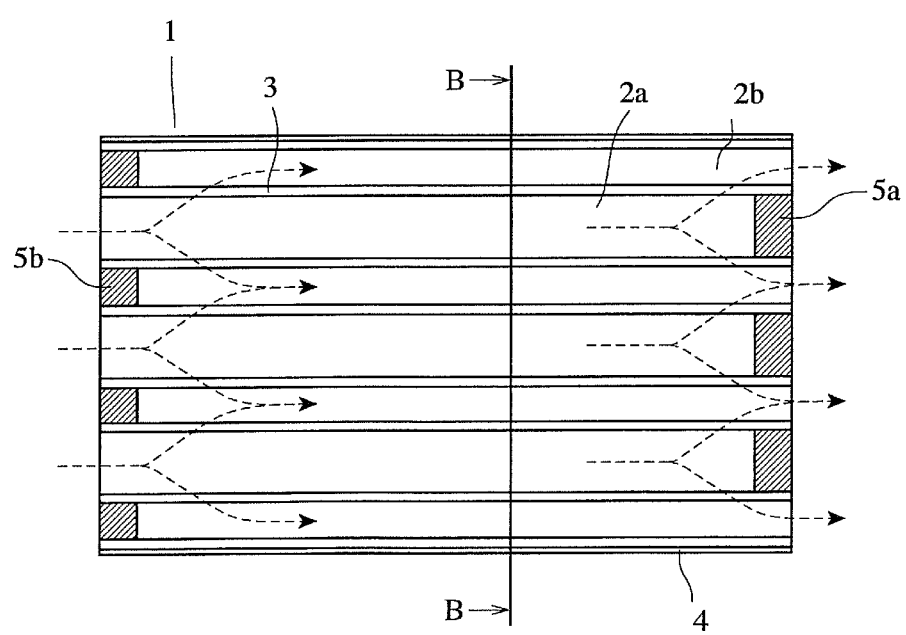
FIG. 2 is a schematic view showing a cross section taken along the line A-A in FIG. 1.
Figure 3:
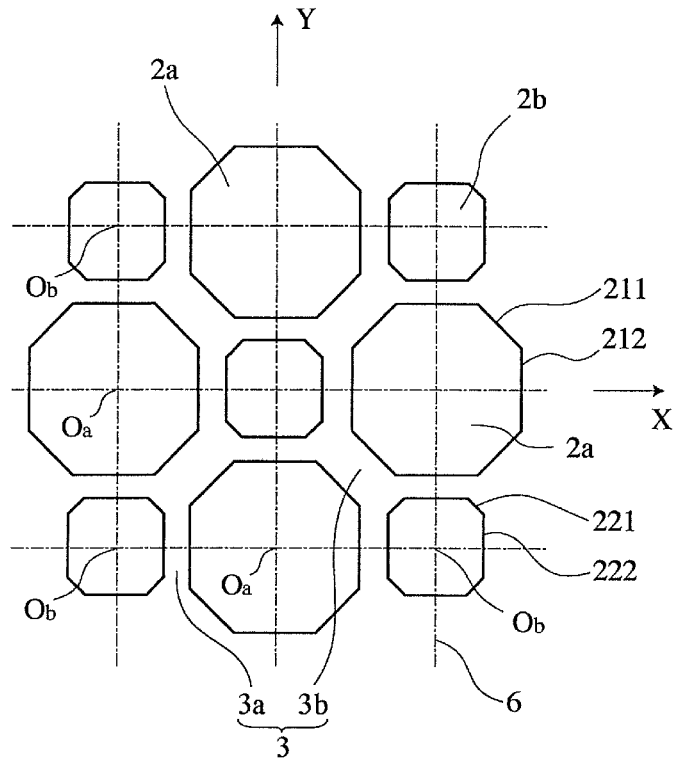
FIG. 3 is a schematic view showing a part of a cross section taken along the line B-B in FIG. 2.
Figure 4:
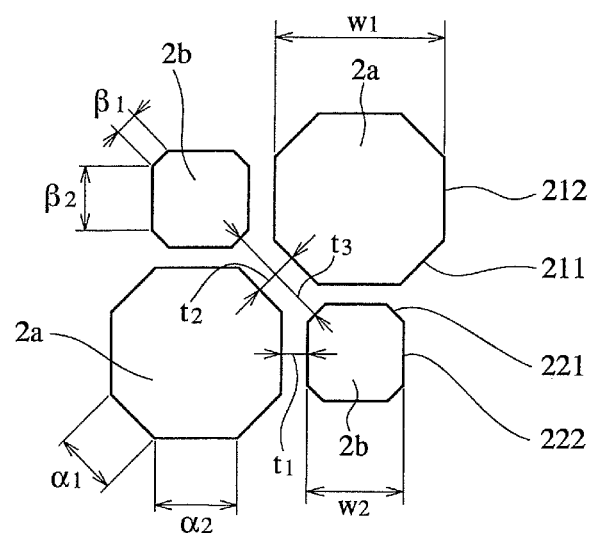
FIG. 4 is a schematic view showing a part of a cross section taken along the line B-B in FIG. 2 in detail.

FIG. 1 is a perspective view schematically showing an example of the ceramic honeycomb filters of the present invention. FIG. 2 is a cross-sectional view taken along the line A-A in FIG. 1. Further, FIGS. 3 and 4 are partial cross-sectional views taken along the line B-B in FIG. 2. The ceramic honeycomb filter 1 of the present invention having a circular or elliptical cross section in a plane perpendicular to the longitudinal directions of flow paths 2 comprises porous cell walls 3 defining flow paths 2 for a fluid, and an outer peripheral wall 4, the flow paths 2 being constituted by two types of flow paths (intake flow paths 2a and discharge flow paths 2b) having different cross section areas in a plane perpendicular to the longitudinal directions of the flow paths 2.

In the ceramic honeycomb filter 1 of the present invention, as shown in FIG. 2, a fluid entering one end of the filter 1 at which the intake flow paths 2a are open passes through the porous cell walls 3 to the discharge flow paths 2b as a passing fluid, and exits from the other end at which the discharge flow paths 2b are open. Accordingly, the flow paths 2 are constituted by intake flow paths 2a which are open at one end and sealed by plugs 5a at the other end, and discharge flow paths 2b which are sealed by plugs 5b at one end and open at the other end.

In a cross section cut along a plane perpendicular to the longitudinal directions of the intake flow paths 2a and the discharge flow paths 2b, the cross section areas of the intake flow paths 2a are larger than those of the discharge flow paths 2b, and the intake flow paths 2a and the discharge flow paths 2b have octagonal cross section shapes with four-fold rotation symmetry each obtained by cutting off four corners from a square. Incidentally, the cross section area of a flow path means the opening area of a flow path open in the above cross section. In the above cross section, as shown in FIG. 3, the intake flow paths 2a and the discharge flow paths 2b are alternately arranged both in a first direction X and in a second direction Y perpendicular to the first direction X. The intake flow paths 2a and the discharge flow paths 2b are arranged such that their axis centers Oa, Ob are aligned along the same straight lines in the first and second directions X and Y. Each intake flow path 2a has two sides 212 perpendicular to the first direction X and parallel to the second direction Y and two sides 212 perpendicular to the second direction Y and parallel to the first direction X. Likewise, each discharge flow path 2b has two sides 222 perpendicular to the first direction X and parallel to the second direction Y, and two sides 222 perpendicular to the second direction Y and parallel to the first direction X.

Further, in the above cross section, the intake flow paths 2a and the discharge flow paths 2b are arranged such that their opposing sides are parallel via cell walls 3a between them. The sides of an intake flow path 2a and a discharge flow path 2b opposing via a cell wall 3a between them are, for example, in FIG. 4, a side 212 of the intake flow path 2a and a side 222 of the discharge flow path 2b. The intake flow paths 2a and the discharge flow paths 2b are arranged such that these sides 212 and 222 are parallel. Accordingly, the opposing sides (a side 211 of one intake flow path 2a and a side 211 of an adjacent intake flow path 2a) are also parallel via a cell wall 3b between them.

Each intake flow path 2a is adjacent to four discharge flow paths 2b via cell walls 3a, with the same distance between the axis center Oa of the intake flow path 2a and the axis centers Ob of four discharge flow paths 2b. Likewise, each discharge flow path 2b is adjacent to four intake flow paths 2a via cell walls 3a, with the same distance between the axis center Ob of the discharge flow path 2b and the axis centers Oa of four intake flow paths 2a. Namely, the intake flow paths 2a and the discharge flow paths 2b are arranged such that their axis centers Oa, Ob are positioned at intersections of a square lattice.

Figure 5:
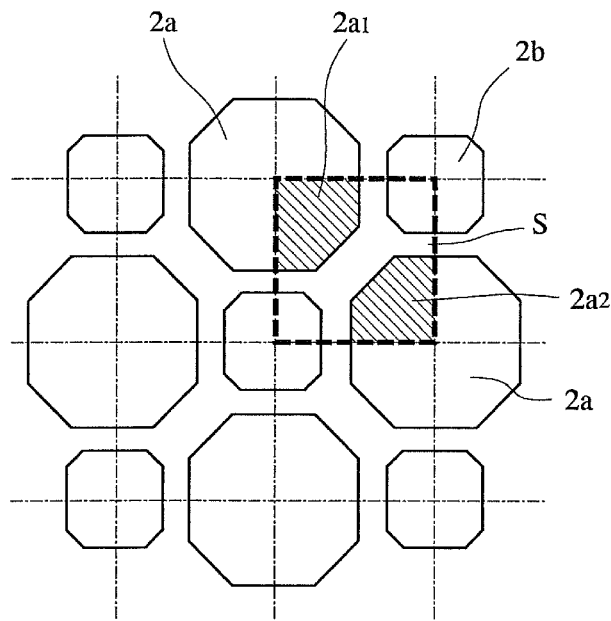
FIG. 5 is a schematic view for explaining the calculating method of the opening ratio of intake flow paths in the ceramic honeycomb filter of the present invention.

The thickness t1 of a cell wall 3a between an intake flow path 2a and a discharge flow path 2b adjacent to that intake flow path 2a is 0.150-0.260 mm, the thickness t2 of a cell wall 3b between adjacent intake flow paths 2a, 2a meets the relation of 1.175<t2/t1<1.6, and the opening ratio of the intake flow paths 2a is 45-60%. The opening ratio of the intake flow paths 2a means a ratio of a total cross section area (opening area) of the intake flow paths 2a to the cross section area of the ceramic honeycomb filter 1, in a cross section cut along a plane perpendicular to the longitudinal directions of the flow paths 2. Specifically, as shown in FIG. 5, in a quadrangular unit cross section region S having sides each connecting the axis center of an intake flow path 2a and the axis center of an adjacent discharge flow path 2b, the opening ratio of the intake flow paths is determined by dividing a total cross section area of intake flow paths $2a_1$, $2a_2$ by the area of the unit cross section region S.

Because the cross section areas of the intake flow paths 2a are larger than those of the discharge flow paths 2b, the opening ratio of the intake flow paths 2a being 45-60%, and the number of the flow paths per $cm^2$ being 30-60, in the ceramic honeycomb filter of the present invention, as described above, it is possible to suppress pressure loss increase with soot, which is caused by the closure of intake flow paths 2a open at one end (on the fluid intake side) when an exhaust gas containing fine particles flows into the ceramic honeycomb filter 1. Though initial pressure loss increase may occur by a larger opening ratio of intake flow paths 2a, which leads to relatively smaller cross section areas of discharge flow paths 2b, cell walls 3a having as small thickness t1 as 0.150-0.260 mm between intake flow paths 2a and adjacent discharge flow paths 2b reduce the resistance of an exhaust gas passing through the cell walls 3a from the intake flow paths 2a to the discharge flow paths 2b, thereby suppressing initial pressure loss increase.

Because the intake flow paths 2a and the discharge flow paths 2b have octagonal cross section shapes with four-fold rotation symmetry each obtained by cutting off four corners from a square, and because the intake flow paths 2a and the discharge flow paths 2b are alternately arranged in a first direction and a second direction perpendicular to the first direction such that their opposing sides are parallel via the cell walls 3a, the cell walls 3b surrounded by two adjacent intake flow paths 2a and two adjacent discharge flow paths 2b are not opposing the corners of the intake flow paths 2a and the discharge flow paths 2b, so that the corners of the intake flow paths 2a and the discharge flow paths 2b are unlikely to act as breakage-starting points of the cell walls 3b. Further, because the thickness t1 of a cell wall 3a between an intake flow path 2a and a discharge flow path 2b adjacent to that intake flow path 2a and the thickness t2 of a cell wall 3b between adjacent intake flow paths 2a, 2a meet the relation of 1.175<t2/t1<1.6, improved strength can be obtained as compared with conventional honeycomb filters comprising octagonal intake flow paths and quadrangular discharge flow paths, even when the cell wall thickness t1 is as small as 0.150-0.260 mm.

The opening ratio of the intake flow paths 2a is 45-60%. When the above opening ratio is less than 45%, the intake flow paths are closed by PM accumulated on cell walls when an exhaust gas containing fine particles flows through the ceramic honeycomb filter 1, resulting in increased pressure loss with soot. On the other hand, the opening ratio exceeding 60% leads to a relatively smaller cross section area of the discharge flow paths, resulting in increased initial pressure loss. The opening ratio of the intake flow paths 2a is preferably 47% or more, and more preferably 49% or more. Also, the opening ratio of the intake flow paths 2a is preferably 58% or less, and more preferably 56% or less.

The thickness t1 of a cell wall 3a between an intake flow path 2a and a discharge flow path 2b adjacent to that intake flow path 2a is 0.150-0.260 mm. The thickness t1 of less than 0.150 mm fails to provide a sufficient effect of improving the strength, and the thickness t1 of more than 0.260 mm leads to higher initial pressure loss. The thickness t1 is preferably 0.160 mm or more, and more preferably 0.170 mm or more. Also, the thickness t1 is preferably 0.250 mm or less, and more preferably 0.240 mm or less.

The thickness t2 of a cell wall 3b between adjacent intake flow paths 2a, 2a meets the relation of 1.175<t2/t1<1.6. With 1.175<t2/t1, namely when t2 is more than 1.175 times as large as t1, a fluid flows easily from the intake flow paths 2a to the discharge flow paths 2b, making it possible to capture fine particles effectively. However, the t2/t1 of 1.175 or less makes it difficult for a fluid to flow from the intake flow paths 2a to the discharge flow paths 2b, failing to capture fine particles effectively. On the other hand, the t2/t1 of 1.6 or more results in too large difference between t2 and t1, making it likely to cause breakage at intersections of cell walls 3a and 3b by heat shock. The t2/t1 is preferably more than 1.2, and more preferably more than 1.3. Also, the t2/t1 is preferably less than 1.58, and more preferably less than 1.55.

The intake flow paths 2a and the discharge flow paths 2b have octagonal cross section shapes with four-fold rotation symmetry each obtained by cutting off four corners from a square as described above. All eight sides of each intake flow path 2a may have the same length, or the length $\alpha 1$ of a side 211 opposing an adjacent intake flow path 2a may be different from the length $\alpha 2$ of a side 212 opposing an adjacent discharge flow path 2b, though each intake flow path 2a has four sides 211 having the same length $\alpha 1$, and four sides 212 having the same length $\alpha 2$ (see FIG. 4). The ratio of $\alpha 1$ to $\alpha 2$ ($\alpha 1/\alpha 2$) is preferably 1.2 or less. The ratio $\alpha 1/\alpha 2$ of more than 1.2 leads to too large thickness t2 of a cell wall 3b between adjacent intake flow paths 2a, 2a, resulting in large initial pressure loss. The ratio $\alpha 1/\alpha 2$ is more preferably 1.0 or less, further preferably 0.8 or less, further preferably 0.6 or less, and most preferably 0.50 or less. Also, the ratio $\alpha 1/\alpha 2$ is preferably 0.2 or more. When the ratio $\alpha 1/\alpha 2$ is less than 0.2, the thickness t2 of the cell walls 3b is too small, failing to obtain a sufficient effect of improving the strength. The ratio $\alpha 1/\alpha 2$ is more preferably 0.3 or more, and further preferably 0.35 or more.

Likewise, all eight sides of each discharge flow path 2b may have the same length, or the length 131 of a side 221 opposing an adjacent discharge flow path 2b may be different from the length $\beta 2$ of a side 222 opposing an adjacent intake flow path 2a, though each discharge flow path 2b has four sides 221 having the same length $\beta 1$, and four sides 222 having the same length $\beta 2$ (see FIG. 4). The ratio of $\beta 1$ to $\beta 2$ ($\beta 1/\beta 2$) is preferably 1.2 or less. The ratio $\beta 1/\beta 2$ of more than 1.2 leads to too large thickness t3 of a cell wall 3b between adjacent discharge flow paths 2b, 2b, resulting in increased initial pressure loss. The ratio $\beta 1/\beta 2$ is more preferably 1.0 or less, further preferably 0.8 or less, and most preferably 0.6 or less. Also, the ratio $\beta 1/\beta 2$ is preferably 0.3 or more. The ratio $\beta 1/\beta 2$ of less than 0.3 provides corners acting as breakage-starting points to cell walls 3b between adjacent discharge flow paths 2b, 2b, failing to obtain a sufficient effect of improving the strength. The ratio $\beta 1/\beta 2$ is more preferably 0.35 or more, and further preferably 0.4 or more. Incidentally, eight sides may be connected via small curved portions R.

The ratio $\beta 1/\alpha 1$ of the length $\beta 1$ of a side 221 of each discharge flow path 2b to the length $\alpha 1$ of a side 211 of each intake flow path 2a is preferably 1.50 or less. The ratio $\beta 1/\alpha 1$ of more than 1.50 leads to too large thickness t3 of a cell wall 3b between adjacent discharge flow paths 2b, resulting in increased initial pressure loss. The ratio $\beta 1/\alpha 1$ is more preferably 1.40 or less, further preferably 1.30 or less, and most preferably 1.25 or less. Also, the ratio $\beta 1/\alpha 1$ is preferably 0.30 or more. The ratio $\beta 1/\alpha 1$ of less than 0.30 provides corners acting as breakage-starting points to cell walls 3b between adjacent discharge flow paths 2b, 2b, failing to obtain a sufficient effect of improving the strength. The ratio $\beta 1/\alpha 1$ is more preferably 0.40 or more, and further preferably 0.45 or more.

In the ceramic honeycomb filter 1 of the present invention, the number of flow paths per $cm^2$ is 30-60 (15-30 in intake flow paths, and 15-30 in discharge flow paths). Because the above unit cross section region S (see FIG. 5) contains one flow path (0.5 intake flow path and 0.5 discharge flow path), the number of flow paths per $cm^2$ 30-60 means that the unit cross section region S contains 30-60 flow paths per 1 $cm^2$. In other words, the unit cross section region S is preferably a square having each side of 0.183 to 0.129 cm. For example, 30 squares each having a side of 0.183 cm provide a total area of 0.183 cm×0.183 cm×30=1 $cm^2$, and 60 squares each having a side of 0.129 cm provide a total area of 0.129 cm×0.129 cm×60=1 $cm^2$. Less than 30 flow paths per $cm^2$ fail to provide a sufficient effect of improving the strength, while the number of flow paths exceeding 60 per $cm^2$ results in large initial pressure loss. The number of flow paths per $cm^2$ is preferably 40 or more, and more preferably 45 or more. Also, the number of flow paths per $cm^2$ is preferably 55 or less, and more preferably 50 or less.

The porous cell walls 3 of the ceramic honeycomb filter 1 of the present invention preferably has a porosity of 45-60%. The porosity of less than 45% leads to large pressure loss with soot when PM is accumulated. The porosity is preferably 48% or more, and further preferably 50% or more. On the other hand, the porosity exceeding 60% results in a low initial PM-capturing ratio after regeneration. The porosity is preferably 59% or less, and further preferably 58% or less. Incidentally, the porosity of cell walls is measured by mercury porosimetry described below.

The porous cell walls 3 of the ceramic honeycomb filter 1 of the present invention preferably have a median pore diameter d50 of 5-20 μm. When the median pore diameter d50 is less than 5 μm, it is difficult to keep low initial pressure loss at an early stage of use after regeneration. The median pore diameter d50 is preferably 7 μm or more, and further preferably 9 μm or more. On the other hand, the median pore diameter d50 of more than 20 μm deteriorates the PM-capturing performance. The median pore diameter d50 is preferably 18 μm or less, and further preferably 16 μm or less.

The measurement of a porosity and a median pore diameter by mercury porosimetry can be conducted by using Autopore III 9410 available from Micromeritics. This measurement is conducted by setting a test piece (10 mm×10 mm×10 mm) cut out of the ceramic honeycomb structure in a measurement cell, evacuating the cell, and then pressurizing the cell by introducing mercury to measure the volume of mercury forced into pores in the test piece. Because mercury is introduced into finer pores under higher pressure, the relation between a pore diameter and a cumulative pore volume (cumulative volume of pores in a range from the maximum pore diameter to a particular pore diameter) can be determined from the relation between pressure and the volume of mercury intruded into pores. Mercury is first introduced into large pores and then into smaller pores successively. A pore diameter converted from the pressure is cumulated from a larger pore diameter to a smaller pore diameter to obtain a cumulative pore volume (corresponding to the volume of mercury), which is plotted against the pore diameter, thereby obtaining a graph showing the relation between the pore diameter and the cumulative pore volume. In the present invention, the mercury-intruding pressure is 0.5 psi ($0.35 \times 10^{-3}$ $kg/mm^2$), and the cumulative pore volume at mercury pressure of 1800 psi (1.26 $kg/mm^2$, corresponding to a pore diameter of about 0.1 μm) is defined as the total pore volume.

From the measured mercury porosimetry results, the porosity and the median pore diameter d50 [pore diameter (μm) at which the cumulative pore volume is 50% of the total pore volume] are calculated. The porosity can be determined from the total pore volume V and the true specific gravity p of a cell wall material by the formula of [ρ×V/(1+ρ×V)]×100(%). For example, the porosity is calculated with a true specific gravity of 2.52 g/cm$^3$ for cordierite when it is used as a cell wall material of a ceramic honeycomb filter, or 3.21 g/cm$^3$ for silicon carbide when it is used as a cell wall material of a ceramic honeycomb filter.

Because the ceramic honeycomb filter of the present invention is used for removing PM, etc. from an exhaust gas discharged from internal combustion engines such as diesel engines, etc. to clean the exhaust gas, it is preferably as large as 125-400 mm in outer diameter and 125-400 mm in length depending on the displacements of internal combustion engines.

A cell wall material for the ceramic honeycomb filter 1 is preferably at least one selected from the group consisting of silicon carbide, cordierite, silicon carbide/oxide composite materials, silicon/silicon carbide composite materials, silicon nitride, mullite, alumina, silica, spinel, lithium aluminum silicate, and aluminum titanate, from the aspect of strength and heat resistance. Among them, cordierite is preferable because of a small thermal expansion coefficient and excellent heat shock resistance. A silicon carbide/oxide composite material is further preferable because of higher heat resistance. The silicon carbide/oxide composite material is composed of silicon carbide aggregate and an oxide binder, and the oxide preferably comprises at least one selected from the group consisting of cordierite, mullite, spinel, alumina, sapphirine and cristobalite.

A plugging material for sealing the flow paths 2 may be selected from those for the cell walls of the ceramic honeycomb filter 1, and may be the same as the cell wall material. The plugging material may be formed by aggregate of the same material as for the cell walls bound by colloidal oxide such as colloidal silica, colloidal alumina, etc.

The ceramic honeycomb filter of the present invention may be provided with an outer peripheral wall 4. The outer peripheral wall 4 may be formed simultaneously with the extrusion of a ceramic honeycomb structure. Alternatively, an outer peripheral portion of a ceramic honeycomb structure having no outer peripheral wall may be removed by machining, and then an outer peripheral wall may be coated on a peripheral surface of the ceramic honeycomb structure. A coating material for the outer peripheral wall comprises ceramic particles, which may be made of cordierite, silica, alumina, etc., and water. The binder may comprise colloidal oxide such as colloidal silica, colloidal alumina, etc.

The plugs 5a, 5b in the intake flow paths 2a and the discharge flow paths 2b are preferably as long as 2-15 mm in the flow path direction. When their length is less than 2 mm, there are small contact areas between the cell walls 3 and the plugs 5, failing to have enough strength, so that the plugs may be detached. When their length exceeds 15 mm, the cell walls have relatively small exposed areas, resulting in higher pressure loss, or the plugs may be broken by heat shock.

Figure 6:
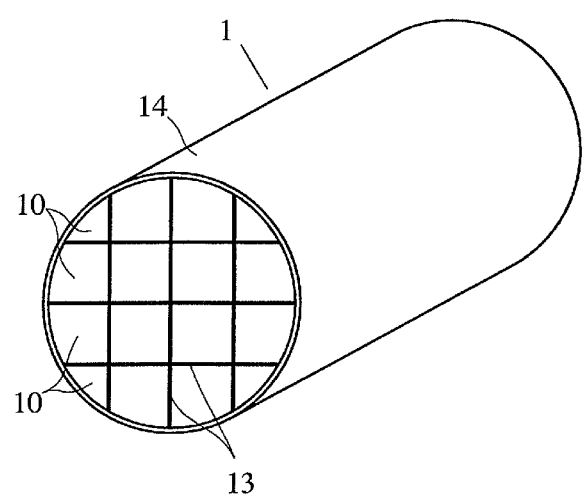
FIG. 6 is a perspective view schematically showing another example of the ceramic honeycomb filters of the present invention.

As shown in FIG. 6, another example of the ceramic honeycomb filters of the present invention may be a honeycomb segment assembly, in which honeycomb segments 10 are integrally face-bonded to each other via bonding layers 13. Such a ceramic honeycomb filter constituted by bonded honeycomb segments is a honeycomb segment assembly formed by integrally bonding honeycomb segments 10 via bonding layers 13 as shown in FIG. 6, each honeycomb segment 10 meeting conditions described below, in a cross section perpendicular to the longitudinal directions of intake and discharge flow paths 2a, 2b, (a) the cross section areas of the intake flow paths 2a are larger than those of the discharge flow paths 2b;
(b) the intake flow paths 2a and the discharge flow paths 2b have octagonal cross section shapes with four-fold rotation symmetry each obtained by cutting off four corners from a square;
(c) the intake flow paths 2a and the discharge flow paths 2b are alternately arranged in a first direction and a second direction perpendicular to the first direction, such that their opposing sides are parallel via cell walls 3a;
(d) the opening ratio of the intake flow paths 2a is 45-60%;
(e) the number of the flow paths per cm$^2$ is 30-60;
(f) the thickness t1 of a cell wall between an intake flow path 2a and a discharge flow path 2b adjacent to that intake flow path 2a is 0.150-0.260 mm; and
(g) the thickness t2 of a cell wall between adjacent intake flow paths 2a, 2a meets $1.175<t2/t1<1.6$.

A peripheral surface of the honeycomb segment assembly is preferably coated with an outer peripheral coating layer 14.

[2] Production Method of Ceramic Honeycomb Filter

The production method of the ceramic honeycomb filter of the present invention will be explained below. First, a ceramic material is mixed and blended with an organic binder, a pore-forming material and water to form a plasticized moldable ceramic material.

The ceramic material is preferably at least one selected from the group consisting of silicon carbide, a cordierite-forming material, a silicon carbide/oxide composite material, a silicon/silicon carbide composite material, silicon nitride, mullite, alumina, silica, spinel, lithium aluminum silicate, and aluminum titanate. Among them, the cordierite-forming material is preferable because cordierite has a small thermal expansion coefficient and excellent heat shock resistance. The silicon carbide/oxide composite material is further preferable because of excellent heat resistance. The silicon carbide/oxide composite material is composed of silicon carbide aggregate particles and an oxide binder, and the oxide preferably comprises at least one selected from the group consisting of cordierite particles, mullite particles, spinel particles, alumina particles, sapphirine particles, cristobalite particles, and raw material powders for forming cordierite, mullite, spinel, alumina, sapphirine or cristobalite.

The organic binder may be methylcellulose, hydroxypropyl methylcellulose, hydroxyethyl cellulose, carboxymethyl cellulose, polyvinyl alcohol, etc.

The pore-forming material may be flour, graphite, starch, solid or hollow resins (polymethylmethacrylate, polybutylmethacrylate, polyacrylate, polystyrene, polyethylene, polyethylene terephthalate, methylmethacrylate-acrylonitrile copolymer, etc.), etc. Preferable among them are hollow resin particles, particularly hollow resin particles of a methylmethacrylate-acrylonitrile copolymer.

The resultant moldable ceramic material is extruded through a honeycomb-extruding die, cut to a predetermined length to obtain a ceramic honeycomb green body having flow paths (intake flow paths 2a) having relatively large cross section areas and flow paths (discharge flow paths 2b) having relatively small cross section areas as shown in FIG. 5, and dried in a hot-air furnace or a heat treatment furnace, or by microwaves, etc. to obtain a dry ceramic honeycomb body. After machining its end surfaces, peripheral surface, etc. if necessary, the ceramic honeycomb body is sintered to produce a ceramic honeycomb structure. Proper sintering conditions may be selected depending on the types of ceramic materials used, because they are different by the conditions. For example, when a cordierite-forming material is used, the sintering temperature is preferably 1350-1440° C., and the sintering time as a time period in which the maximum temperature is kept is preferably 3-10 hours. When silicon carbide or a silicon carbide/oxide composite material is used, the sintering temperature is preferably 1200-1450° C., and the sintering time as a time period in which the maximum temperature is kept is preferably 3-10 hours.

After removing an outer peripheral portion from the sintered ceramic honeycomb structure by machining, plugs 5a, 5b are formed. Plugs 5a are formed in fluid-exiting end portions of the intake flow paths 2a, and plugs 5b are formed in fluid-entering end portions of the discharge flow paths 2b. Conventionally known methods may be used for the formation of the plugs 5a, 5b. A specific example is that a film is attached to each end surface of the ceramic honeycomb structure, the film is provided with holes at positions at which plugs are to be for tried in the flow paths, and an end portion of the honeycomb structure to which the film is attached is immersed in or pressed into a plugging slurry comprising a plug-forming material, to fill opening end portions of the flow paths, which are to be sealed, with the plugging slurry through the holes of the film. After drying the filled plugging slurry, it is hardened by heating and sintering if necessary to form the plugs.

A peripheral surface of the ceramic honeycomb structure provided with plugs is coated with an outer wall material and then dried. The outer wall material may be a coating material comprising ceramic particles and colloidal silica. The ceramic particles may be cordierite, silica, alumina, mullite, etc.

The production method of the above-described ceramic honeycomb filter comprising bonded honeycomb segments (see FIG. 6) will then be explained. The ceramic honeycomb filter constituted by a honeycomb segment assembly is produced by extruding the above moldable ceramic material through a honeycomb-extruding die to a quadrangular shape of the honeycomb segment 10 shown in FIG. 6, cutting it to a predetermined length to obtain a honeycomb segment green body having flow paths (intake flow paths 2a) having relatively large cross section areas and flow paths (discharge flow paths 2b) having relatively small cross section areas as shown in FIG. 5, and drying the honeycomb segment green bodies in a hot-air furnace or a heat treatment furnace, or by microwaves, etc. to obtain dry honeycomb segments. After machining their end surfaces, peripheral surfaces, etc., if necessary, they are sintered to produce honeycomb segments 10 for the ceramic honeycomb structure. Proper sintering conditions may be selected depending on the types of ceramic materials, because they are different by the types of ceramic materials. For example, when a cordierite-forming material is used, the sintering temperature is preferably 1350-1440° C., and the sintering time as a time period in which the maximum temperature is kept is preferably 3-10 hours. When silicon carbide or a silicon carbide/oxide composite material is used, the sintering temperature is preferably 1200-1450° C., and the sintering time as a time period in which the maximum temperature is kept is preferably 3-10 hours.

Plugs 5a, 5b are formed in both end portions of the sintered ceramic honeycomb segment 10 having a honeycomb structure. Conventionally known methods may be used for the formation of the plugs 5a, 5b. A specific example is that a film is attached to each end surface of the ceramic honeycomb segment 10, the film is provided with holes at positions at which plugs are to be formed in the flow paths, and an end portion of the honeycomb segment 10 to which the film is attached is immersed in or pressed into a plugging slurry comprising a plug-forming material, to fill opening end portions of the flow paths, which are to be sealed, with the plugging slurry through the holes of the film. After drying the filled plugging slurry, it is hardened by heating and sintering if necessary to form the plugs.

For example, 16 honeycomb segments 10 provided with plugs are prepared as shown in FIG. 6, and their peripheral surfaces are bonded to each other by a binder, dried, and then sintered if necessary. The binder may contain ceramic particles, inorganic fibers, an inorganic binder, an organic binder, and other additives if necessary. Though the number of bonded honeycomb segments 10 is 16 in FIG. 6, it is not restrictive. For example, four honeycomb segments 10 with adjusted sizes may be used.

Thereafter, a peripheral surface of a honeycomb segment assembly constituted by bonded honeycomb segments 10 is machined to a predetermined peripheral shape, coated with a coating layer 14, dried, and then hardened by sintering if necessary, to obtain a honeycomb segment assembly comprising honeycomb segments 10 integrally bonded to each other via bonding layers 13.

The honeycomb filter of the present invention can be obtained by the above production method. Incidentally, plugs may be formed by filling a plugging slurry into a dry ceramic honeycomb body before sintering, and then sintering both dry ceramic honeycomb body and plugs.

EXAMPLE

The present invention be explained in more detail by Examples below without intention of restricting the present invention thereto.

Examples 1 and 2, and Comparative Examples 1 and 2

Figure 7:
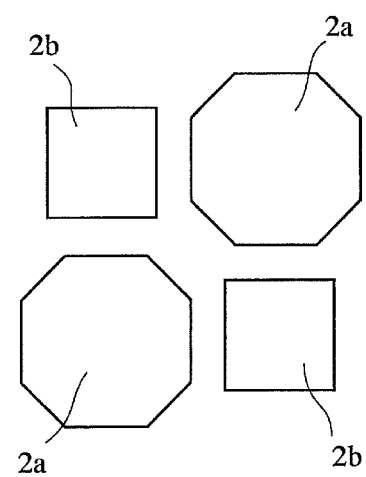
FIG. 7 is a schematic view showing a cross section of the ceramic honeycomb filter of Comparative Examples 1 and 2 perpendicular to the flow path direction.

As cordierite-forming materials, kaolin powder, talc powder, silica powder and alumina powder were mixed to a cordierite composition comprising 50% of $SiO_2$, 36% of $Al_2O_3$ and 14% of MgO by mass, and hollow resin particles as a pore-forming material, and methylcellulose and hydroxypropyl methylcellulose as organic binders were added thereto. After fully mixing in a dry state, the resultant mixture was sufficiently blended with water to prepare a plasticized moldable ceramic material. This moldable ceramic material was molded to a honeycomb shape by an extrusion-molding die, and cut to a green body of 280 mm in diameter and 314.8 mm in length. This green body was dried by microwaves, kept at the maximum temperature of 1410° C. for 25 hours for sintering, and then machined to remove its outer peripheral portion, thereby obtaining the cordierite-type ceramic honeycomb structures of Examples 1 and 2 each having a cell structure, in which flow paths having large cross section areas and flow paths having small cross section areas were arranged alternately, each flow path having an octagonal cross section shape with four-fold rotation symmetry obtained by cutting off four corners from a square as shown in FIGS. 1-4, and the cordierite-type ceramic honeycomb structures of Comparative Examples 1 and 2 each having a cell structure, in which flow paths had cross section shapes shown in FIG. 7. Table 1 shows their specific shapes and structures.

After removing an outer peripheral portion by machining from each ceramic honeycomb structure such that it had a diameter of 264.7 mm, a plugging slurry of a cordierite-forming material was charged into flow path end portions such that they were alternately sealed by plugs, dried, and sintered at 1400° C. The sintered plugs were as long as 7-10 mm. A peripheral surface of the ceramic honeycomb structure provided with plugs was coated with an outer wall material comprising amorphous silica and colloidal silica, and then dried. Two cordierite-type ceramic honeycomb filters each having an outer diameter of 266.7 mm and a length of 304.8 mm were obtained in each of Examples 1 and 2 and Comparative Examples 1 and 2. Their cell structures are shown in Table 1 (see FIG. 4), and their porosities and median pore diameters are shown in Table 2.

Each ceramic honeycomb filter of Examples 1 and 2 and Comparative Examples 1 and 2 was measured with respect to a porosity and a median pore diameter by mercury porosimetry and evaluated with respect to A-axis compressive strength, and another ceramic honeycomb filter was evaluated with respect to initial pressure loss and pressure loss with soot, by methods described below. These results are shown in Table 2.

(a) Measurement of Porosity and Median Pore Diameter

According to mercury porosimetry, a test piece (10 mm×10 mm×10 mm) cut out of each ceramic honeycomb filter was set in a measurement cell of Autopore III available from Micromeritics, the cell was evacuated, and mercury was then introduced into the cell under pressure to determine the relation between the pressure and the volume of mercury forced into pores in the test piece. A pore diameter converted from the pressure was cumulated from a smaller pore diameter to a larger pore diameter to obtain a cumulative pore volume (corresponding to the volume of mercury), which was plotted against the pore diameter, thereby obtaining a graph showing the relation between the pore diameter and the cumulative pore volume. The mercury-intruding pressure was 0.5 psi ($0.35 \times 10^{-3}$ kg/mm$^2$), and constants used for calculating the pore diameter from the pressure were a contact angle of 130°, and a surface tension of 484 dyne/cm. The cumulative pore volume at a mercury pressure of 1800 psi (1.26 kg/mm$^2$, corresponding to a pore diameter of about 0.1 μm) was regarded as a total pore volume. The total pore volume, the porosity, and the median pore diameter at which a cumulative pore volume was 50% of the total pore volume were calculated from the mercury porosimetry measurement results. The porosity was determined from the total pore volume V and the true specific gravity ρ (=2.52 g/cm$^3$) of cordierite as a cell wall material, by the formula of $[\rho \times V/(1+\rho \times V)] \times 100(\%)$.

(b) A-Axis Compressive Breakage Strength

The A-axis compressive breakage strength was measured according to M505-87, "Test Method of Monolithic Ceramic Carrier for Automobile Exhaust Gas Cleaning Catalyst" of the Society of Automotive Engineers of Japan, and expressed by a relative value assuming that the measured value of Comparative Example 1 was 1.00.

(c) Initial Pressure Loss

The initial pressure loss was measured on a ceramic honeycomb filter fixed to a pressure loss test stand, to which air was supplied at a flow rate of 10 Nm$^3$/min, and expressed by pressure difference between the inlet side and the outlet side (pressure loss), and expressed by a relative value assuming that the measured value of Comparative Example 1 was 1.00. Incidentally, the ceramic honeycomb filter was fixed such that open ends of intake flow paths having larger cross section areas, which were not sealed by plugs, were arranged on the air-receiving side.

(d) Pressure Loss with Soot

The pressure loss with soot was measured by supplying air at a flow rate of 10 Nm$^3$/min, with combustion soot having an average particle size of 0.11 μm at a rate of 1.3 g/h, to a ceramic honeycomb filter fixed to a pressure loss test stand, and measuring pressure difference between the inlet side and the outlet side (pressure loss) when the amount of soot attached to the filter reached 2 g per one litter of the filter. The pressure loss with soot was expressed by a relative value assuming that the measured value of Comparative Example 1 was 1.00. Incidentally, the ceramic honeycomb filter was fixed such that open ends of intake flow paths having larger cross section areas, which were not sealed by plugs, were arranged on the air-receiving side.

TABLE 1

| No. | Example 1 | Example 2 | Comparative Example 1 | Comparative Example 2 |
|---|---|---|---|---|
| Shape of Intake Flow Paths | Octagonal | Octagonal | Octagonal | Octagonal |
| Shape of Discharge Flow Paths | Octagonal | Octagonal | Quadrangular | Quadrangular |
| Opening Width w1 (mm) of Intake Flow Paths | 1.582 | 1.532 | 1.420 | 1.370 |
| Opening Width w2 (mm) of Discharge Flow Paths | 0.996 | 0.946 | 1.100 | 1.050 |
| Opening Ratio (%) of Intake Flow Paths | 54 | 51 | 48 | 45 |
| Cell Wall Thickness t1 (mm) | 0.178 | 0.228 | 0.178 | 0.228 |
| Cell Wall Thickness t2 (mm) | 0.260 | 0.310 | 0.181 | 0.252 |
| t2/t1 | 1.46 | 1.36 | 1.02 | 1.11 |
| $\alpha 1^{(1)}$ (mm) | 0.424 | 0.403 | 0.156 | 0.156 |
| $\alpha 1^{(2)}$ (mm) | 0.982 | 0.962 | 1.200 | 1.150 |
| $\alpha 1/\alpha 2$ | 0.43 | 0.42 | 0.13 | 0.14 |
| $\beta 1^{(3)}$ (mm) | 0.283 | 0.262 | — | — |
| $\beta 1^{(4)}$ (mm) | 0.596 | 0.576 | 1.100 | 1.050 |
| $\beta 1/\beta 2$ | 0.47 | 0.45 | — | — |
| Number of Flow Paths per cm$^2$ | 46 | 46 | 48 | 48 |

Note
(1)α1 represents the length of a side 211 opposing an adjacent 5 intake flow path among the sides of the intake flow paths.
(2)α2 represents the length of a side 212 opposing an adjacent discharge flow path among the sides of the intake flow paths.
(3)β1 represents the length of a side 221 opposing an adjacent discharge flow path among the sides of the discharge flow paths.
(4)β2 represents the length of a side 222 opposing an adjacent intake flow path among the sides of the discharge flow paths.

TABLE 2

| No. | Example 1 | Example 2 | Comparative Example 1 | Comparative Example 2 |
|---|---|---|---|---|
| Porosity (%) | 57.5 | 57.5 | 58.0 | 58.0 |
| Median Pore Diameter (μm) | 11.5 | 11.5 | 12.0 | 12.0 |

TABLE 2-continued

| No. | Example 1 | Example 2 | Comparative Example 1 | Comparative Example 2 |
|---|---|---|---|---|
| Initial Pressure Loss | 1.01 | 1.03 | 1.00 | 1.07 |
| Pressure Loss with Soot | 0.90 | 0.92 | 1.00 | 1.05 |
| A-Axis Compressive Strength | 1.13 | 1.41 | 1.00 | 1.26 |

It is clear from Table 2 that the ceramic honeycomb filters of Examples 1 and 2 in the present invention had improved pressure loss with soot and A-axis compressive strength over those of Comparative Example 1 while keeping initial pressure loss. Though the ceramic honeycomb filter of Comparative Example 2 has improved A-axis compressive strength, it had poor initial pressure loss and pressure loss with soot.

What is claimed is:

1. A ceramic honeycomb filter comprising pluralities of flow paths partitioned by porous cell walls, a fluid entering one end of said filter and flowing through said porous cell walls being discharged from the other end of said filter;

pluralities of said flow paths comprising intake flow paths which are open on said one end side and sealed on said other end side, and discharge flow paths which are sealed on said one end side and open on said other end side; and in a cross section perpendicular to the longitudinal direction of said flow paths, (a) cross section areas of said intake flow paths being larger than those of said discharge flow paths;
(b) said intake flow paths and said discharge flow paths having octagonal cross section shapes with four-fold rotation symmetry, such that all flow paths in the ceramic honeycomb filter having octagonal cross section shapes have four-fold rotation symmetry;
(c) said intake flow paths and said discharge flow paths being alternately arranged in a first direction and a second direction perpendicular to said first direction, such that their opposing sides are parallel via said cell walls;
(d) an opening ratio of said intake flow paths being 45-60%;
(e) number of said flow paths per $cm^2$ being 30-60;
(f) a thickness t1 of a cell wall between an intake flow path and a discharge flow path adjacent to that intake flow path being 0.150-0.260 mm; and
(g) a thickness t2 of a cell wall between adjacent intake flow paths meeting $1.175 < t2/t1 < 1.6$.

2. The ceramic honeycomb filter according to claim 1, wherein in a cross section perpendicular to the longitudinal direction of said flow paths, the length $\alpha 1$ of a side of said intake flow path opposing an adjacent intake flow path, the length $\alpha 2$ of a side of said intake flow path opposing an adjacent discharge flow path, the length $\beta 1$ of a side of said discharge flow path opposing an adjacent discharge flow path, and the length $\beta 2$ of a side of said discharge flow path opposing an adjacent intake flow path meet $0.2 < \alpha 1/\alpha 2 < 1.2$, $0.3 < \beta 1/\beta 2 < 1.2$, and $0.3 < \beta 1/\alpha 1 < 1.5$.

3. The ceramic honeycomb filter according to claim 1, wherein said porous cell walls have porosity of 45-60% and a median pore diameter of 5-20 μm.

* * * * *